United States Patent [19]

Mohan

[11] Patent Number: 5,418,940
[45] Date of Patent: May 23, 1995

[54] METHOD AND MEANS FOR DETECTING PARTIAL PAGE WRITES AND AVOIDING INITIALIZING NEW PAGES ON DASD IN A TRANSACTION MANAGEMENT SYSTEM ENVIRONMENT

[75] Inventor: Chandrasekaran Mohan, San Jose, Calif.

[73] Assignee: International Business Machines Corporation, Armonk, N.Y.

[21] Appl. No.: 102,016

[22] Filed: Aug. 4, 1993

[51] Int. Cl.$^6$ .............................................. G06F 11/00
[52] U.S. Cl. .................................... 395/575; 395/425; 395/600
[58] Field of Search .......................... 395/575, 425, 600

[56] References Cited

U.S. PATENT DOCUMENTS 4,298,929 11/1981 Capozzi ................................. 395/425
4,498,145 2/1985 Baker et al. .......................... 364/900

OTHER PUBLICATIONS

Aries: A Transaction Recovery Method Supporting Fine-Granularity Locking and Partial Rollbacks Using Write Ahead Logging vol. 17, No. 1 Feb. 7, 1992.

TDB vol. 25, No. 11B Apr. 1983 Partial Data Page Write Detection R. A. Crus et al.

Primary Examiner—Charles E. Atkinson
Attorney, Agent, or Firm—R. Bruce Brodie

[57] ABSTRACT

A method for detecting partial page writes in pages spanning multiple sectors of a sector organized multiple tracked storage facility in a page oriented, log based transaction management system. During a page write to storage from a buffer, a status bit is embedded at the end of each page sector and a status byte in the last page sector, the status byte is complemented, and each status bit is swapped with a counterpart in the status byte as it is being written out to storage. During a page read in the buffer from storage the status bit values of each page are swapped with their byte counterpart and a partial write detected as a mismatch of the bits in the status byte. Page recovery involves recreating a page from said log upon detection of either a partial sector write or a partial page write by redoing all accessing events on the log between a predetermined point to an end of log including unconditionally redoing of all format page events logged in said interval. Partial page write error is also detected where page is allocated to the buffer while avoiding a page read from storage.

11 Claims, 4 Drawing Sheets

PAGE AND TRACK LAYOUT

METHOD AND MEANS FOR DETECTING PARTIAL PAGE WRITES AND AVOIDING INITIALIZING NEW PAGES ON DASD IN A TRANSACTION MANAGEMENT SYSTEM ENVIRONMENT

FIELD OF THE INVENTION

This invention relates to transaction management systems, and more particularly, to the detection of partial page write errors where the pages span multiple sectors of recording tracks of the DASD storage portion of such systems.

DESCRIPTION OF RELATED ART

The following description includes a summary of some attributes of page oriented, log based, transactions management systems and their interaction with attached cyclic track and sector organized, direct access storage devices (DASD) as storage subsystems. One aspect of their interaction is the detection of write errors as data is recorded on DASD-sectors of any given track. These errors are denominated as "partial write sector errors" and "partial page write errors". The problems become acute where the page extends over several sectors and where the sector extents are recorded out of order.

Aspects of Transaction Management Systems

A transaction management system (TMS) typically includes a central processing unit (CPU), an external DASD subsystem storing a database of modifiable pages, and means for accessing and transferring pages between the storage subsystem and the CPU. Applications executing on the CPU interact with the pages by way of "transactions". In this regard, a "transaction" is defined to be a logical unit of work comprising a sequence of operations that transforms a consistent state of a recoverable resource (pages) into another consistent state without necessarily preserving consistency at all intermediate points. That is, a transaction is a bounded series of operations changing selected pages in the database from one state to another atomically. Thus, each transaction must be either completed or aborted with no intermediate states permitted.

In a log based TMS, all changes to the pages are written to a log in the form of REDO and UNDO records. The physical log can be a reserved portion of DASD or a tape subsystem or the like. Now, REDO/UNDO records themselves are written to the log before writing any of the changed or modified pages back to their DASD storage locations. This is termed write ahead logging. These change records are used to either recreate or REDO a transaction that has progressed to a point of completion or roll back or UNDO a transaction that has failed to progress to that point.

A prior art description of the current state of the art in page oriented write ahead log (WAL) based TMS using in-place updating performed on non-volatile (DASD) storage and associated recovery measures is Mohan et al, "ARIES: A Transaction Recovery Method Supporting Fine Granularity Locking and Partial Rollbacks Using Write Ahead Logging", ACM Transactions on Database Systems, Vol. 17, No. 1, March, 1992. Reference may also be made to the copending Haderle et al, U.S. Ser. No. 07/758,540, filed Sep. 5, 1991, "Method For Managing Subpage Concurrency Control and Partial Transaction Rollback in a Transaction Oriented System of the Write Ahead Logging Type".

A TMS as set out in the Mohan and Haderle references is characterized by the fact each transaction is bounded by a BEGIN primitive, and either a COMMIT, or an ABORT and an END primitive i.e. the transaction being of the form "BEGIN ops, ops, . . . , ops COMMIT/ABORT . . . END".

In a system capable of multi-tasking or the like, transactions overlap in time and completion such that some transactions would have just initiated, others would be "in-flight", others either committed or aborted, while still others ended in the recent past. This means that a phased commit system guarantees that if a transaction executes some updates against selected pages in a database, and a failure occurs before the transaction reaches its normal termination (END) or an interim point of consistency (COMMIT/ABORT), then those updates will be UNDOne. Otherwise, the transactions that have reached a normal termination (END) or an interim point of consistency (COMMIT/ABORT) will be REDOne (in the period including COMMIT/ABORT but just prior to END).

To achieve the recovery actions, information synchronism must be provided between modified pages and the counterpart log records. Such is achieved by inclusion of a unique ascending log sequence number (LSN) in each modified page and a page number in the REDO/UNDO record written to the log. Thus, the modified pages index their change record positions in the log and the log records index the pages modified.

DASD Sectors and Partial Sector Write Error

In the art, TMS's externally attach DASD subsystems as backing storage for the page sets called by executing transactions and for logging the information state changes. Ensuring page integrity must take into account the nature of the storage subsystem which continually records and refreshes the TMS. For this reason, the discussion next turns to the logical organization of pages and their recording relationship to DASD.

It is well appreciated that each track of a cyclic multi-tracked DASD is partitioned into a predetermined number of equal length recording extents termed "sectors". A typical sector on a DASD track can record up to 512 bytes. A typical page of 4000 bytes would obviously span in the order of 8 sectors.

In writing out sector extents from a buffer to a DASD track, errors can arise in several contexts.

A first context occurs where fixed length sector extents of data are being written to DASD and the stream of data terminates short of the DASD sector boundary.

A second context arises where an error or erasure occurs in the stream of data being moved between the buffer and the record medium. To detect occurrence of error or erasure, redundancy check bytes are computed over the string and appended at the end as the data is being recorded. System awareness of a sector write error would occur only upon a read operation where the recorded redundancy bytes would not match redundancy bytes calculated over the corrupted data stream as it is read out.

A modification of this technique is by marking data as invalid within the storage subsystem once it has been determined that an error in the path to data occurred. Alternatively, the invalid data could be discarded. Reference may be made to Beardsicy et. al. in copending application U.S. Ser. No. 07/995,092, filed Dec. 22, 1992, entitled "Invalid Data Detection, Recording, and Nullification".

Prior Art Partial Page Write Detection

Reliance on storage subsystem partial sector write detection does not provide assurance where the error is outside of its detection capabilities as where the errors are compensating.

Crus et al, "Partial Data Page Write Detection", 1983 IBM Tech. Discl. Bull. p. 5889, April 1983, discloses the use of a pair of check bits placed at the beginning and end of a page and inverted as the page is written out to DASD. A partial write would be detected since upon being read, the check bits of a page in error would mismatch.

More particularly, where a write operation fails in such a way that for a k sector page, the first r physical sectors in length of a page are written but the last k−r sectors are not, then it must be possible to detect this condition upon subsequent reading of the page from secondary storage.

The technique used is to initialize a bit in the first byte of the page and a bit in the last byte of the page to the same value when a page is first allocated and then to invert both bits before each write operation (note that the bytes of the page are written, with respect to time, in first-byte to last-byte order). If the 2-bit values are found to be unequal upon read of the page, then an error has been detected. Significantly, no provision is made for out of order sector writing of a page to DASD.

Out of Order Sector Writing of A Page Spanning Multiple Sectors

Out of order sector writing to DASD is advantageous in minimizing the effect of rotational delay upon the DASD writing rate. This is done by matching the order of writing of the page in a buffer at the host or control unit to the sectors along an accessed DASD track as it rotationally passes under a DASD recording write head. Relatedly, when a page consisting of multiple sectors is being written to DASD, instead of always writing the sectors of that page in first to last sequence or order, some DASD (disk drives) such as those conforming to the small computer standard interface (SCSI) architecture reorder the sector writes to optimize performance. In the event of such a reordering, the method as described in Crus et al using only 1 bit each in the header and trailer of the page to detect partial page writes is not sufficient. This is because, for example, a partial write which resulted in both the first and the last sectors being written but some other sector not being written will not be detected.

Recovery In Write Ahead Log Based Transaction Management Systems and Partial Page Write Errors As mentioned in Haderle et al, in transaction management systems in which recovery is based on write-ahead logging (WAL), a log sequence number (LSN) uniquely identifies each log record. Furthermore, during recovery operations, the state of a page can be related to the log records written for that page, since the LSN of the log record identifying the most recent update to the page is stored in the page itself. Relatedly, whether an update represented by the log record is already reflected on a given page can be satisfied by a simple comparison between the LSN recorded on the given page with the log record's LSN. Based on such comparisons, some REDO or UNDO actions may or may not be performed. Recovery using LSN comparisons assumes that the page was written in its entirety to DASD storage when it was last written.

Where the WAL transaction management system uses an LSN based recovery method, then during recovery after system failure the DASD stored version of a page is ignored if a format log record is encountered for the page during restart REDO recovery. In such cases, the system requests its buffer manager to allocate a slot in the buffer pool ignoring the old version of the page and start REDOing all updates including formatting for that page from that point forward. Reference should be made to Baker et al, U.S. Pat. No. 4,498,145, "Method for Assuring Atomicity of Multirow Update Operations in a Data base System", issued Feb. 5, 1985.

In the event of WAL recovery in a TMS system, if some log records for a given page precede a format log record for that same page and if those preceding log records were encountered during a REDO scan, then a partial page write problem may arise. More particularly, the REDO logic, being unaware that a format log record will be encountered shortly, accesses the page and checks the page's LSN to determine whether the earlier log record updates have to be redone. If the page in fact had been partially written as where the page LSN sector extent had not been written to DASD, then the page LSN would be less than the LSN of the particular log record for that page.

SUMMARY OF THE INVENTION

It is an object of this invention to devise a method and means to detect partial writes to DASD of a page spanning multiple sectors irrespective of the order in which the sectors are written.

It is a related object that such method and means be operable in a page oriented, log based transaction management systems (TMS).

It is yet another related object that the method and means for the detection of partial page writes remains viable where a page is allocated in the TMS buffer pool without requiring that an old version of the page be read into the buffer from DASD storage.

These and other objects are satisfied in a TMS system attaching DASD external storage in which during a page write to DASD, a status bit in each of N sector extents of a page is set to a common value However, since the status bits might contain user data, their original values are saved in an N bit mirror byte. The mirror byte is sited in the last sector. The N bits in the mirror byte are flipped and then swapped with the N counterpart status bits prior to recording. As a result, each partial page write is detected as a function of an anomalous value among bits of the N status bits during a page read. Page recovery is invoked upon detection of either a partial sector write or a partial page write.

More particularly, the method and means of the invention arise in a system having a cyclic, multi-tracked, sector organized DASD external store, means for recording in the external store changes to each page, and means for detecting partial sector writes to DASD. The recording means include a buffer and manager thereof for processing each page prior to writing out to DASD.

The inventive method is directed to detecting a partial write of a page spanning multiple track sectors. It comprises the steps of (a) partitioning and formatting a page in the buffer into N sector extents such that each extent includes a status bit while the last extent also includes an N bit mirror byte of the status bits of all of N extents; (b) responsive to writing a page to the store from the buffer, logically complementing the bits of the mirror byte, swapping the N status bits with counterpart bits in the mirror byte, and recording the page on a multi-sectored track of the DASD store; and (c) responsive to reading a page into the buffer from the store and absent a partial write sector error, swapping the contents of the N status bits from the N extents with the counterpart bits in the mirror byte, and initiating page recovery in the event that at least one of the swapped bits in the mirror byte has an uncommon value.

Where the system is of a log based, page oriented transaction management system type, it preferably includes means for recording all modification events of the pages of the store on a log prior to recording the state of changed pages in the store. In this regard, the method further includes the step of (d) recreating a page from said log upon detection of either a partial sector write or a partial page write. The page is recreated by redoing all of the events recorded in the log from a predetermined point to the end of log including redoing the format page operations.

In order that the method and means of the invention remain viable where a page is allocated in the TMS buffer pool without requiring that an old version of the page be read into the buffer from DASD storage, it is necessary to ensure that the buffer manager does not calculate the value of the check bits during such allocation. This is accomplished by retaining the current recorded state of the mirror bits during the formatting performed as part of the allocation procedure. This is possible only if the previous version of the page resides in the buffer pool. Otherwise, the bits are assigned an arbitrary value. This guarantees that if a partial write were to occur after a page allocation or reallocation, then the partial write would be detected.

DESCRIPTION OF THE PREFERRED EMBODIMENT

A CPU Environment for Executing the Method of the Invention

The invention can be conveniently practiced in a configuration in which each CPU in the system is an IBM/360 or 370 architected CPU type having an IBM MVS operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", issued Jun. 10, 1980.

An MVS operating system is also set out in IBM publication GC28-1150, "MVS/Extended Architecture System Programing Library: System Macros and Facilities", Volume 1. Details of standard MVS or other operating system services such as local lock management, sub-system invocation by interrupt or monitor, and the posting and waiting of tasks is omitted. These OS services are believed well appreciated by those skilled in the art.

Implementation Aspects of the Invention and Transaction Management Systems

In order to appreciate the operation of the embodiment of this invention, it should be recalled that a TMS is expressed as an application executing under a given operating system. In this case, the application would illustratively be that of a relational database system of the DB2 type as set out in the Baker et al, U.S. Pat. No. 4,498,145, "Method for Assuring Atomicity of Multi-row Update Operations in a Database System", issued Feb. 5, 1985.

An operating system, among its other tasks organizes memory including internal and external storage as a resource. From the view of an application, memory and storage are virtual and backed by a real demand paging LRU hierarchical form of storage.

Figure 1:
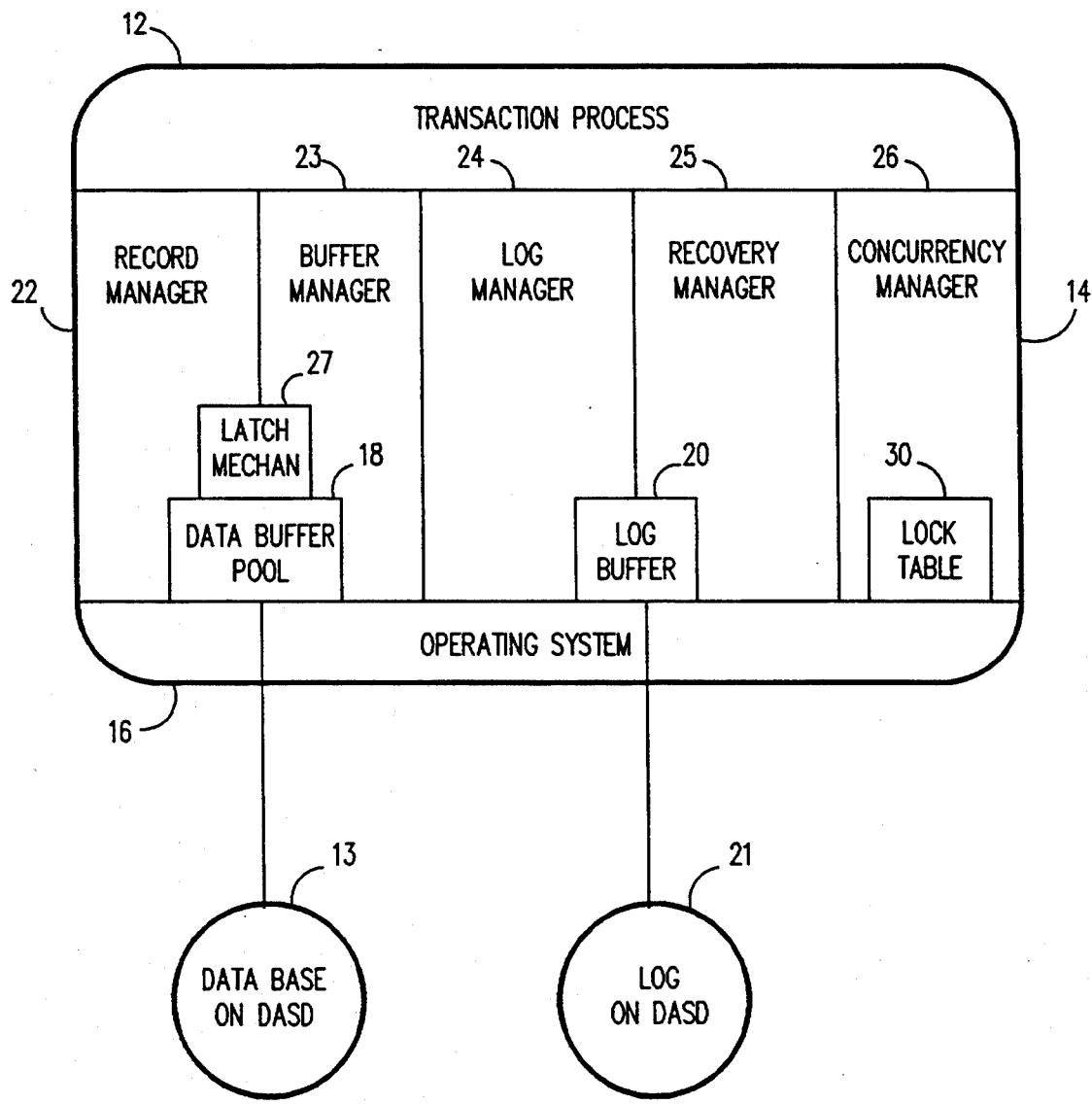
FIG. 1 depicts the logical organization of a log based TMS according to the prior art.

Referring now to FIG. 1, there is shown a TMS in the form of a database system. A transaction process 12 may be an application program whose execution supports the concurrent, overlapping execution of a plurality of transactions. The transactions executed by the process 12 are provided with access to a database 13 through a database management system program 14 (DBMS) and an operating system 16 providing input/output (I/O) services. A data buffer pool 18 is allocated to the DBMS 14 from CPU main memory for data with respect to database 13 which may be stored on DASD. The DBMS 14 is also allocated a log buffer 20 from main memory for storage of log records destined for system log 21.

DBMS 14 includes a record manager 22, a buffer manager 23, a log manager 24, a recovery manager 25, and a concurrency manager 26. The record manager 22 regulates the data structures and storage space of database 13. It provides record level access to transactions and page level access to system utilities such as loading, copying, or recovering a database. The buffer manager moves pages between the database 13 and the buffer pool 18. The latch manager provides short term serialization (shared/exclusive) to pages being read or modified in the buffer pool 18. The log manager 24 generates the log records, assembling them in numbered sequences in log buffer 20, and writing them to log 21. The recovery manager 25 utilizes the log records to return the database to support transaction level recovery while the concurrency manager 26 implements locks via lock table 30.

As pointed out in the Mohan et al and the Haderle et al references, it is desirable for a WAL TMS during normal processing to periodically take checkpoints, the checkpoint log records identify which transactions are active, their states, and the LSNs of their most recent log records, and the modified pages resident in the buffer pool. The latter information is needed to determine from where the REDO pass of restart recovery should begin its processing.

Figure 2:
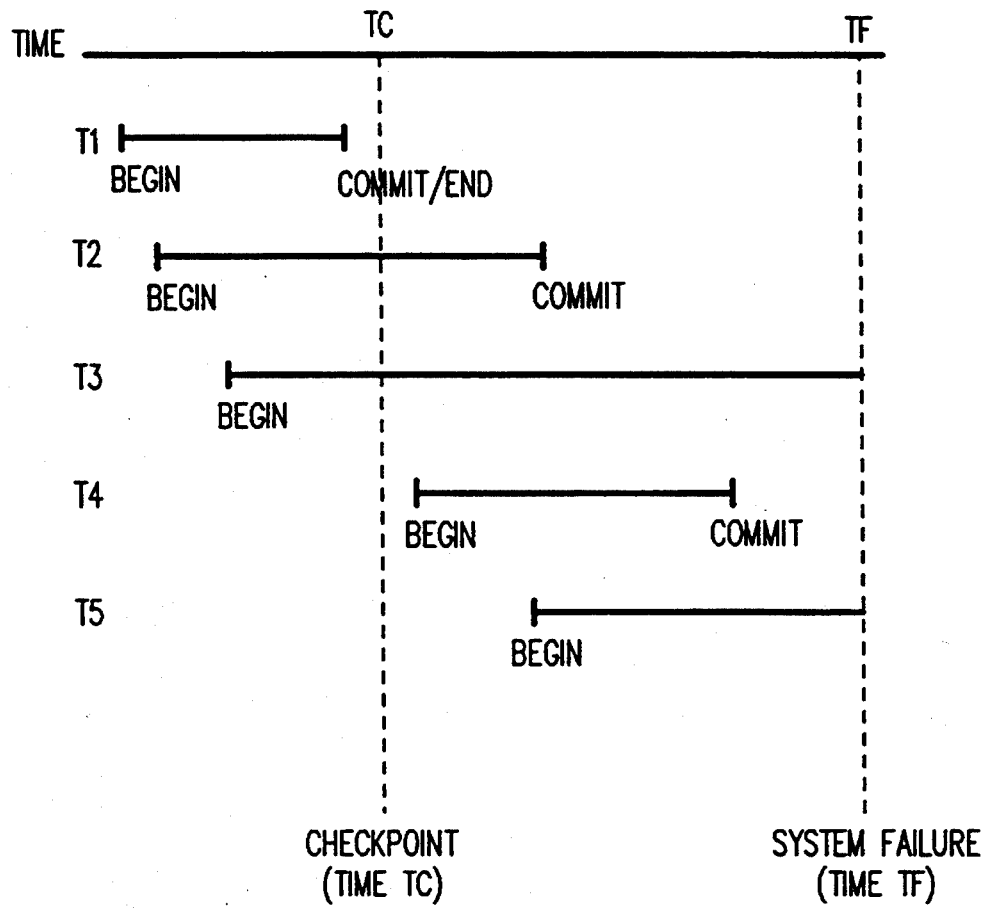
FIG. 2 sets out the relationship among concurrent transactions with respect to REDO and UNDO and the occurrence of failure/in a log based phased commit transaction management system according to the prior art.

Referring now to FIG. 2, there is shown the time of occurrence relations among transaction primitives with reference to checkpoints and system failure. At the occurrence of failure and hence restart, the recovery manager must obtain the address of the most recent checkpoint record from a restart file or its equivalent, locate the checkpoint record in the system log, and proceed to search forward through the log from that point to the end. As a result of this process, the Recovery manager is able to determine both the transactions that need to be UNDOne (UNDO) and the transactions that need to be REDOne (REDO) in order to restore the resources to a consistent state.

Each transaction is categorized as being in one of five classes. Thus, transactions of type T1 were completed before checkpoint time Tc. Transactions of T2 started prior to time Tc and were completed after time Tc but before the system failure time Tf. Transactions of type T3 also started before time Tc but did not complete before time Tf. Transactions of type T4 started after time Tc but were completed before time Tf. Finally, transactions of type T5 started after time Tc but did not complete by time Tf. Assuming that at checkpoint time all modified pages were written to DASD, transactions T2 and T4 are subject to REDO, while transactions T3 and T5 are subject to UNDO.

As also pointed out in the Mohan et al and the Haderle et al references, restart recovery in a log based WAL TMS consists of three passes of the associated log, namely, ANALYSIS, REDO, and UNDO. The TMS first scans the log, starting from the first log record of the last complete checkpoint and continuing up to the end of the log. During this ANALYSIS pass, information included in the checkpoint record about pages that were more up to date in the buffers than on the DASDs and transactions in progress at the time of the checkpoint is brought up to date as of the end of the log by analyzing the log records in that interval. For each page in a list of modified pages, the LSN from which a REDO operation might have to be performed is also determined based on information in the checkpoint log record and the subsequent log records. The list of modified pages from the ANALYSIS pass determines the starting point for the log scan of the next pass and acts as a filter to determine which log records and consequently which database pages have to be examined to see if some updates need to be redone. The ANALYSIS pass also provides the list of in-flight and in-doubt transactions, and the LSN of the latest log record written by each transaction.

In the REDO pass, the TMS system repeats history with respect to those updates logged on stable storage but whose effects on the database pages did not get reflected on DASD before the system failure. This is done for all the updates for all transactions including the updates of in-flight transactions. This step re-establishes the state of the TMS as of the time of the system failure as far as the actions represented in the log on DASD as of the time of the failure. During the subsequent UNDO pass, all in-flight transactions are rolled back, in reverse chronological order, in a single sweep of the log. This is done by continually taking the maximum of the LSNs of the next log record to be processed for each of the yet-to-be-completely-undone transactions.

Layout of Pages, DASD Sectors, Check and Mirror Bits

Figure 3:
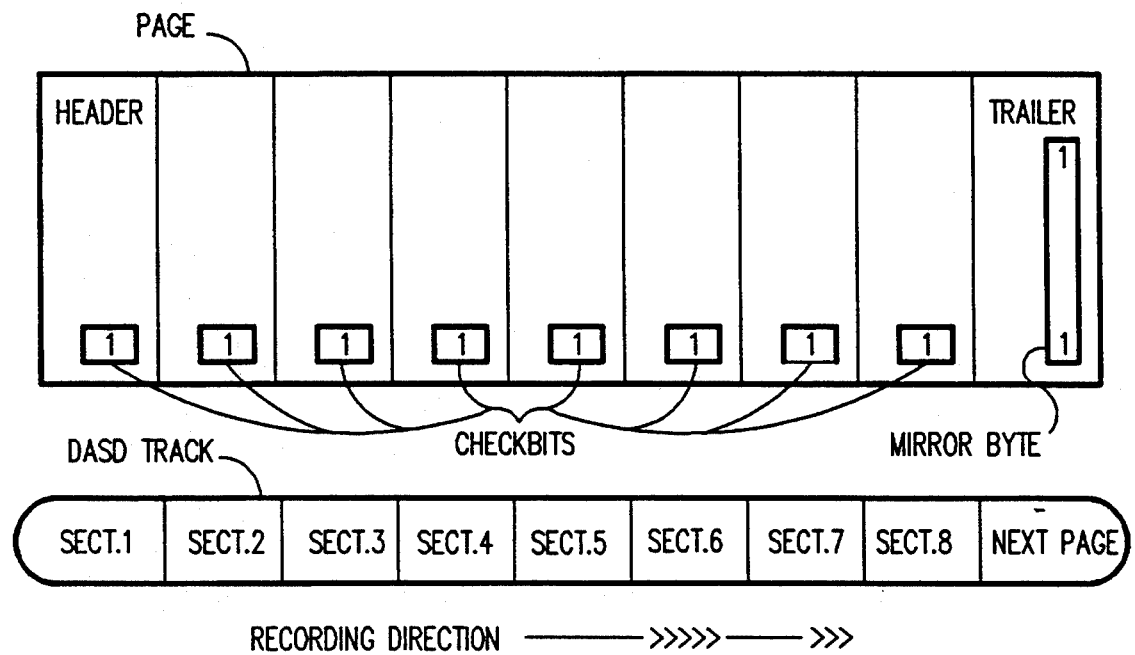
FIG. 3 illustrates page layout across several DASD sectors including check bits and mirror bits according to the invention.

Referring now to FIG. 3, there is shown a page whose length would be recorded over multiple sectors of a DASD track. Normally, a page is 4K bytes long and a sector is 512 bytes long. Thus, a 4 Kilobyte page would be recorded over 8 DASD sectors. Customarily, a page can be described in terms of its sector extents or partitions. Typically, some bytes at the beginning of the first sector (called "header") and some bytes at the end of the eighth sector (called "trailer") are reserved for storing transaction system (as opposed to user) data. The rest of the bytes in those sectors and all the bytes in the other sectors (2 through 7) are available for storing user data (e.g., records, keys, etc.).

The last bit in every sector except in the last sector contains user data when a page is in normal usage in the buffer pool 18. In the last sector alone, in the trailer of that sector, the last few bytes of the last sector are reserved for system usage (call the bits of those bytes "mirror_bits"). For a 4KB-sized page with eight 512-byte sectors, one byte is enough for use as mirror_bits. When such a page is on DASD, the first 7 bits of this byte contain the user data that used to be in the last bits of the first 7 sectors when the page was in the buffer pool 18.

Referring again to FIG. 3, the last bit of each page sector extent except that of the last sector is used as a check_bit expressing the value of 1 or 0. A correspondence is established between the first sector's last bit and the first bit in the mirror_bits area, between the second sector's last bit and the second bit in the mirror_bits area and so on.

Writing A Modified Page Back to DASD According to The Invention

Figure 5:
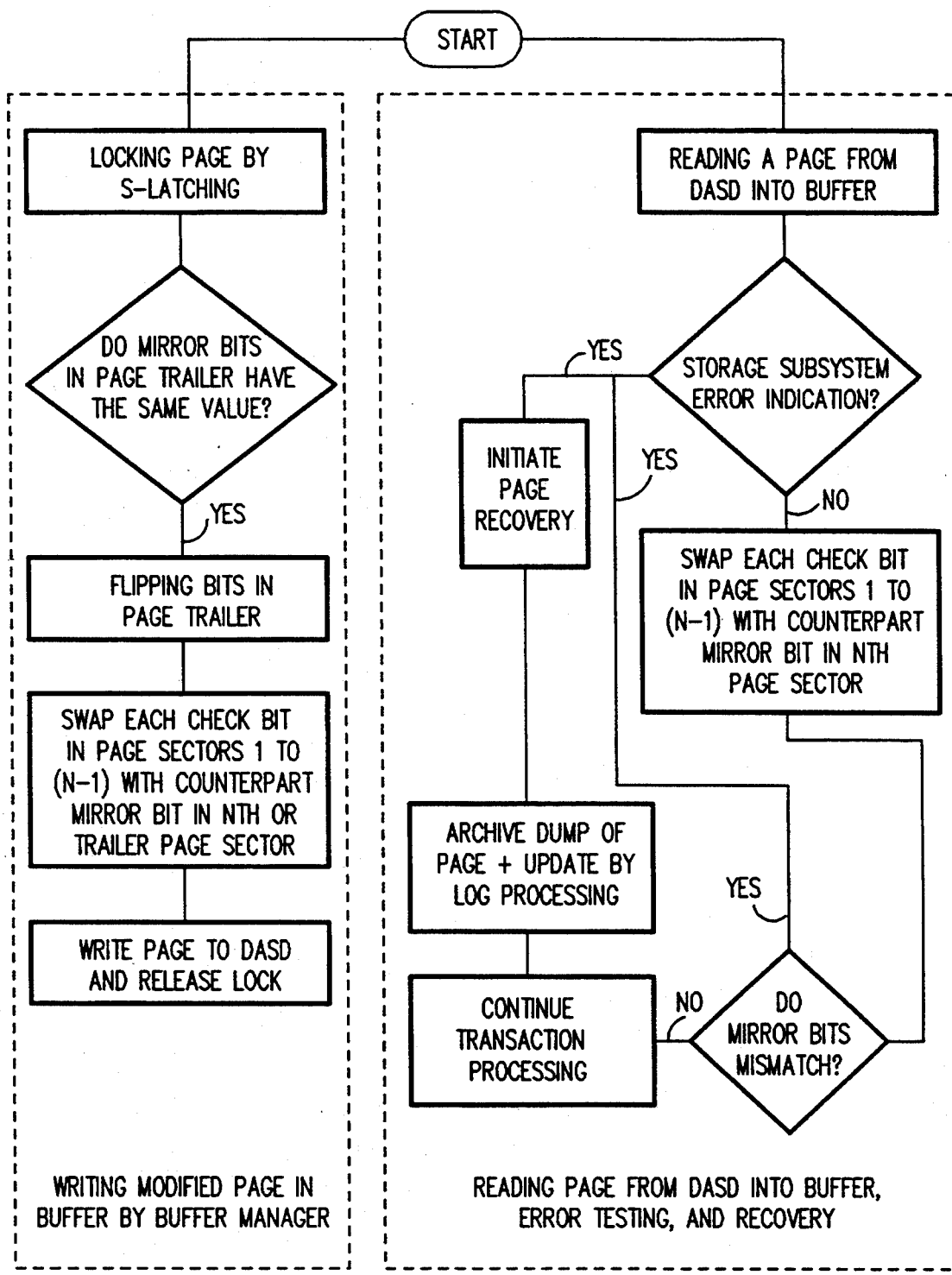
FIG. 5 shows a flow of control of the method of the invention.

Referring now to FIG. 5, there is shown a flow of control of writing a modified page in buffer and thence out to DASD storage. Each of the illustrated steps is described in detail.

At the time of writing a modified page back to DASD, the buffer manager (BM 23) causes the following steps to be executed:

(1) S latching (locking) the page thereby preventing the page from being modified concurrently by user transactions;

(2) flipping the values of the mirror_bits in the system area in the page trailer. Note, all the bits should have the same value (0 or 1). The flipping changes a 0 to a 1 or a 1 to a 0;

(3) for the first 7 sectors of an 8 sector page, swapping the contents of their last bits with the contents of the corresponding bits in the mirror_bits in the page trailer; and (4) writing the page to DASD and once the write I/O (recording on the DASD track) completes, allow page modification by user transactions.

Note that during the DASD write, the sectors of a page are permitted to be written out of sequence (i.e., sector 3, e.g., may be written before sector 1). SCSI DASD drives may do such reordering of sector writes to optimize performance. If it is desirable to allow page modifications by transactions during a DASD write of a page, then that can be accomplished by making a copy of the page in this step and doing the recording on the DASD track from that copy. In this case, some additional synchronization would be necessary to ensure that not more than one read or write operation is initiated simultaneously for a given page.

Figure 4:
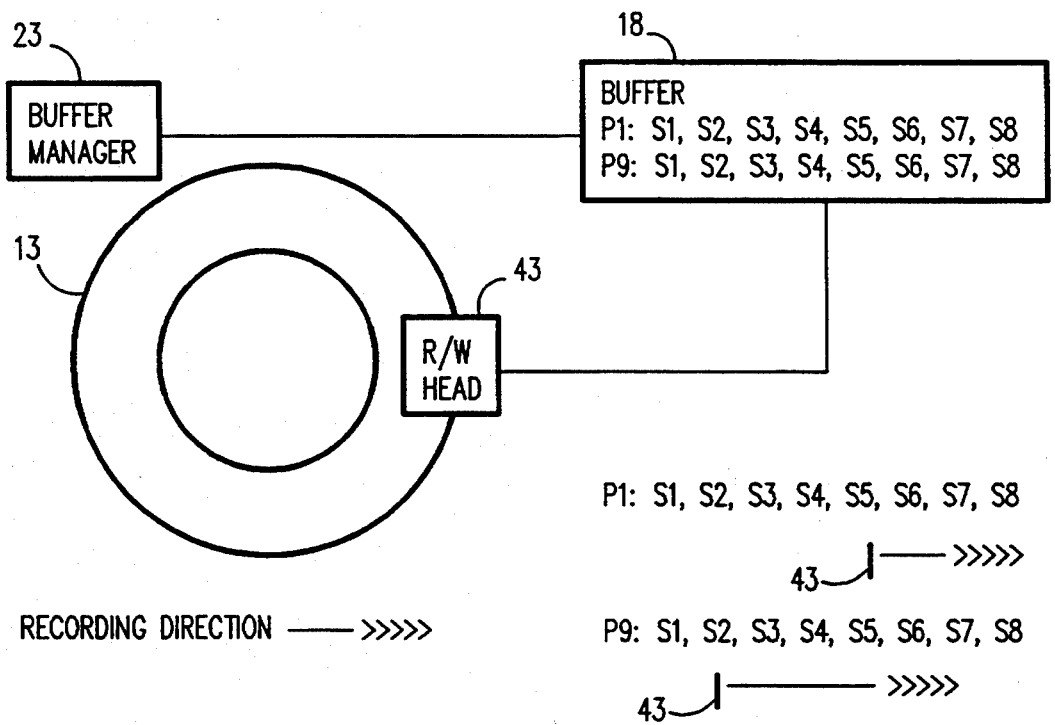
FIG. 4 sets out the out of order sector writing in an SCSI attached DASDs advantageously utilizing the partial page write detection according to the invention.

Referring now to FIG. 4, there is shown a buffer 18 under control of buffer manager 23 in recording relationship with DASD disk 13. Buffer 18 arbitrarily contains two pages P1 and P9 with page sectors S1 to S8 arranged in order. Ideally, if the read/write (R/W) head 43 can be positioned over disk 13 tracks on a scheduled or opportunistic basis, then the sectors of any page or pages in the buffer can be scheduled or transmitted out to the head for recording to minimize the SEEK and latency delays. This means that if head 43 is over the track sectors S5, S6, S7, and S8 of the DASD address for page P1, then the buffer manager causes those sectors of page P1 to be moved out of buffer 18 and recorded via head 43. Similarly, such out of sector sequence recording can be performed with respect to buffer stored page P9 when head 43 is over track sectors starting with sector counterpart to S2.

Reading A Page From DASD According to The Invention

Referring again to FIG. 5, there is also shown the steps of reading a page from DASD into the buffer and evaluating it for error.

At the time of reading a page from DASD, BM 23 causes the following steps to be executed:

(1) reading the page from DASD. If the DASD storage subsystem gives an indication that some sector of the page was partially written (partial sector write error), then initiate page recovery (see next step). Otherwise, once all the sectors of the page are read in without any hardware errors, for the first 7 sectors of the page, swap the contents of their last bits with the contents of the corresponding bits in the mirror_bits in the page trailer; and (2) comparing the values of the bits in the mirror_bits. If they are not all '0's or all '1's, then declare that the page was partially written earlier and initiate page recovery using traditional media recovery techniques (e.g., obtain a copy of the page from an archive dump and bring it up to date by processing the log).

Allocating A Page In A Buffer Pool Without Reading An Old Page From DASD

When an application interacting with BM 23 requests a page to be allocated in the buffer pool 18 without the old version of the page being read from DASD, the buffer manager causes the following steps to be executed:

(1) If the desired page's old version is already in the buffer pool 18, returning the buffer address of that version by the BM 23 while retaining the present mirror-bits' values..

(2) If the desired page's old version is not already in the buffer pool 18, the BM 23 allocates a slot for the page in buffer pool 18 and initializes the contents of the mirror_bits to be all '0's or all '1's. At this point, BM 23 returns the address of that buffer slot.

Note also that the value assigned to the bits may be the opposite of the value those bits currently have on DASD. In this case, during a subsequent write I/O, the page will be written back to DASD with the same bit value as it is already on DASD (due to the bit flipping that is done at the time of a write I/O). The caller of BM 23 formats the page (excluding the mirror_bits) and writes a format_page log record. The mirror_bits' values do not need to be included in the log record located on DASD 21.

Extensions

These and other extensions of the invention may be made without departing from the spirit and scope thereof as recited in the appended claims.

I claim:

1. In a system for detecting error or erasure of a portion of a bit stream partitioned into an ordered set (1,2, ... N) of N segments, the segments being recorded in any order onto a sector organized, tracked storage facility, said storage facility including means for detecting partial sector write error, wherein the improvement comprises the method steps of:

(a) embedding a state bit in each of the N segments and a state byte in the Nth segment;

(b) writing the bit stream on the storage facility including logically complementing the state byte, and as the segments of the bits stream are being written out to counterpart sectors on the facility, swapping the value of each of the state bits with the value in a counterpart position in the state byte; and (c) at any time subsequent, reading the bit stream from the facility and processing the read segments including swapping the value of each of the state bits with the value in a counterpart position in the state byte, comparison matching the swapped bits of the state byte, and providing indication of error in the event of mismatch.

2. The method according to claim 1, wherein step (c) further includes the steps of detecting partial sector write errors, and, initiating page recovery after occurrence of either partial page write error or partial sector write error.

3. A method for detecting a partial page write of a page spanning at least two sectors of a cyclic, tracked, sector organized direct access storage device (DASD), said device including buffer means for retaining at least one page, page accessing means responsive to external access commands for either recording the page on the sectors of at least one track of the device or for copying the page recorded on the device into the buffer, means for detecting partial sector write error, and means for page recovery, comprising the steps of:

(a) partitioning each page in the buffer into N sector extents including provision for a state value embedded in each extent and a group indicator embedded in a predetermined one of the extents;

(b) responsive to each write access applied to a buffer resident page, logically complementing values in the group indicator, and recording each sector extent on at least one DASD track including swapping its sector state value with the value in a counterpart position in the group indicator as each sector is recorded; and (c) responsive to each read access applied to a DASD track resident page, copying said page from at least one DASD track into the buffer including swapping the contents of the N sector state values with the value in the counterpart position in the group indicator, comparing the swapped values in the group indicator, and initiating page recovery in the event that at least one of the swapped values in the group indicator is an uncommon value or upon occurrence of any partial sector write error.

4. The method according to claim 3, wherein the sector state values are bit representations and the group indicator is a byte representation, and further wherein each page spanning several sectors is partitioned into a monotonically ordered set of sector extents having at least a first and a last sector extent, said last sector extent having the group indicator embedded therein.

5. The method according to claim 3, wherein responsive to a request to allocate a page in the buffer without reading a previously written version of said requested page from DASD, said method further comprises the steps of:
  (a) ascertaining whether the previously written version of the page is resident in the buffer;
  (b) if said previously written page version is buffer resident, formatting the page in the buffer while retaining the current state of the group indicator; and
  (c) if said previously written page version is not buffer resident, formatting the page in a new page space and assigning an arbitrary value to the group indicator.

6. In a system having a cyclic, multi-tracked, sector organized external store, means for recording in the external store changes to each page, means for detecting partial sector writes, said recording means including a buffer and manager thereof for processing each page prior to recording, a method for detecting a partial page write of a page spanning multiple sectors, comprising the steps of:
  (a) partitioning and formatting a page in the buffer into N sector extents such that each extent includes a status bit while the last extent also includes an N bit mirror byte of the status bits of all of the N extents;
  (b) responsive to an external write command addressing a page in said buffer, logically complementing the bits of the mirror byte, and recording said page on at least one multi-sectored track of the store including swapping the N status bits with counterpart bits in the mirror byte as each sector extent is recorded; and
  (c) responsive to an external read command addressing a page in the store and absent a partial write sector error, copying said page from at least one multi-sectored track of the store into the buffer including swapping the contents of the N status bits from the N sector extents with the counterpart bits in the mirror byte, comparing the swapped bits in the mirror byte, and initiating page recovery in the event that at least one of the swapped bits in the mirror byte has an uncommon value.

7. The method according to claim 6, wherein said system includes a log based, page oriented transaction management system, said management system further including means for recording all accessing events of the store on a log prior to recording the state of modified pages in the store, and further wherein said method includes the step of:
  (d) recreating a page from said log upon detection of either a partial sector write or a partial page write by redoing all accessing events on the log between a predetermined point to an end of log including unconditionally redoing of all format page events logged in said interval.

8. The method according to claim 6, wherein responsive to a request to allocate a page in the buffer without reading a previously written version of said requested page from DASD, said method further comprises the steps of:
  (a) ascertaining whether the previously written version of the page is resident in the buffer;
  (b) if said previously written page version is buffer resident, formatting the page in the buffer while retaining the current state of the mirror byte; and
  (c) if said previously written page version is not buffer resident, formatting the page in a new page space and assigning an arbitrary value to the mirror byte.

9. In a page oriented transaction management system having at least one transaction executing on a processor, said processor including a buffer and buffer manager, said system further comprising a sector organized DASD storage subsystem in which pages stored therein are staged to and from said buffer under control of said manager, means for generating a log of records of events which alter the information state of each page changed by the transaction and for assigning a log sequence number (LSN) uniquely identifying each log record, means for applying changes by said transactions or portions thereof to said pages in said buffer including storing the most recent pertinent LSN on each counterpart page, means for writing the log to the storage subsystem prior to writing the altered pages from the buffer to said subsystem, means for periodically check pointing said log and recording the same on the log and writing to the subsystem, and means for detecting partial sector write errors in writing pages to storage, wherein the improvement comprises:
  a method for detecting a partial page write of a page spanning at least two sectors any track of the DASD storage subsystem, comprising the steps of:
    (a) partitioning each page in the buffer into N sector extents including provision for a state value embedded in each extent and a group indicator embedded in a predetermined one of the extents;
    (b) responsive to each write access applied to a buffer resident page, logically complementing values in the group indicator, and recording each sector extent on at least one DASD track including swapping its sector state value with the value in a counterpart position in the group indicator as each sector is recorded; and
    (c) responsive to each read access applied to a DASD track resident page, copying said page from at least one DASD track into the buffer including swapping the contents of the N sector state values extents with the value in the counterpart position in the group indicator, comparing the swapped values in the group indicator, and initiating page recovery in the event that at least one of the swapped values in the group indicator is an uncommon value or upon the occurrence of a partial sector write error.

10. The method according to claim 9, wherein in step (c) said page recovery further comprises the step of recreating a page from said log upon detection of either a partial sector write or a partial page write by redoing all accessing events on the log between a predetermined point to an end of log including unconditionally redoing of all format page events logged in said interval.

11. The method according to claim 9, wherein responsive to a request to allocate a page in the buffer without reading a previously written version of said requested page from DASD, said method further comprises the steps of:

(a) ascertaining whether the previously written version of the page is resident in the buffer;

(b) if said previously written page version is buffer resident, formatting the page in the buffer while retaining the current state of the group indicator; and (c) if said previously written page version is not buffer resident, formatting the page in a new page space and assigning an arbitrary value to the group indicator.

* * * * *